United States Patent
Booth et al.

(10) Patent No.: US 7,484,117 B1
(45) Date of Patent: Jan. 27, 2009

(54) METHOD AND APPARATUS FOR DETECTING AND REMEDYING EXCESSIVE LOOP INITIALIZATION

(75) Inventors: Wayne A. Booth, San Jose, CA (US); Douglas W. Coatney, Cupertino, CA (US)

(73) Assignee: Network Appliance, Inc., Sunnyvale, CA (US)

( * ) Notice: Subject to any disclaimer, the term of this patent is extended or adjusted under 35 U.S.C. 154(b) by 511 days.

(21) Appl. No.: 11/207,254

(22) Filed: Aug. 19, 2005

(51) Int. Cl.
*G06F 11/00* (2006.01)

(52) U.S. Cl. .................. 714/8; 714/7; 398/2; 398/3; 398/17

(58) Field of Classification Search ............ 714/7, 714/8; 398/2, 3, 10, 17; 370/221, 222
See application file for complete search history.

(56) References Cited

U.S. PATENT DOCUMENTS

| | | | |
|---|---|---|---|
| 5,999,528 A * | 12/1999 | Chow et al. | 370/365 |
| 6,430,714 B1 * | 8/2002 | McAdam et al. | 714/704 |
| 6,678,839 B2 * | 1/2004 | Mori | 714/44 |
| 6,917,988 B1 * | 7/2005 | Allen et al. | 710/1 |
| 7,036,042 B1 * | 4/2006 | Nguyen | 714/7 |
| 7,054,264 B2 * | 5/2006 | Mor | 370/223 |
| 2006/0083511 A1 * | 4/2006 | Edmunds et al. | 398/25 |
| 2006/0146698 A1 * | 7/2006 | Ukrainetz et al. | 370/221 |

* cited by examiner

*Primary Examiner*—Joshua A Lohn
(74) *Attorney, Agent, or Firm*—Blakely, Sokoloff, Taylor & Zafman LLP

(57) ABSTRACT

A drive shelf includes an embedded switching hub (ESH) that monitors Fibre Channel Arbitrated Loop (FC-AL) traffic, including loop initialization requests (LIRs), coming from drives attached to the ESH. When a number of LIRs issued by a single drive within a certain amount of time exceeds a threshold, the drive is bypassed. One threshold (a "burst" threshold) measures the number of LIRs issued within a short period of time. If the number exceeds a threshold that would prevent other data from circulating through the loop, the drive is bypassed. A second threshold (a long-term threshold) measures the number of LIRs issued within a longer period of time. If the drive issues a number of LIRs at a slower rate than the burst threshold, but still above the long-term threshold, the drive is bypassed.

18 Claims, 6 Drawing Sheets

METHOD AND APPARATUS FOR DETECTING AND REMEDYING EXCESSIVE LOOP INITIALIZATION

FIELD

The present invention generally relates to storage devices and specifically to a shelf that reacts to excessive loop initializations from a connected drive.

BACKGROUND

A network appliance is a processing system that may be connected to a network to provide service to other devices over the network. A file server, or filer, is an example of a network appliance. A filer is a form of storage server which provides file storage and file access to remote clients that request access to the data storage. Another type of storage server, which may be implemented as an appliance, is one which provides clients with block-level access to stored data, rather than file-level access. Such a server can be used in a storage area network (SAN), for example, to provide an interface between clients and mass storage devices.

A filer typically manages a number of storage devices, such as disk drives, that may be assembled in redundant arrays of independent (or inexpensive) disks (RAID) groups. Several drives arranged in RAID groups may be contained in a shelf unit that is managed by a shelf head. The shelf head can monitor the status of the drives and associated hardware, including monitoring physical characteristics of the drives, such as operating temperature, voltage, etc. The shelf may also pass data requests to the drives from the filer.

FIG. 1 illustrates a loop topology. The loop 100 includes a filer communicating with several drives. The filer 102, in this instance, initiates access requests to the several drives 104. The filer 102 and the drives 104 are interconnected using a connection 106. The connection 106 may utilize any one of several loop interconnect technologies, such as Fibre Channel Arbitrated Loop (FC-AL). FC-AL is defined in ANSI standard ANSI X3.272:1996. In this example, requests originate with the filer 102 and travel clockwise (i.e., one-way) through the connection 106. When one of the drives 104 receives an access request from the filer 102, the request is fulfilled, and returned through the connection 106.

If the filer desires data from the drive 104b, a read request is issued through the connection 106. The read request first travels to the drive 104a, which recognizes that the request is not addressed to it, and allows the request to continue on to the drive 104b. When the request reaches the drive 104b, the drive 104b fulfills the request, and returns it to the filer 102 over the connection 106. The fulfilled request passes the drive 104c on its way to the filer 102.

When one of the drives 104 is first connected to the loop 100, the drive 104 issues a loop initialization request (LIR), which generally comprises a number of loop initialization primitives (LIPs). The LIR is used to initiate a connection with the loop 100, assign the new device a loop ID and allow the new device to report its position in the loop 100. All existing devices, including drives, participate in the loop initialization process on loop 100 and, when complete, the initiator device (FC-AL adapter) is made aware of the new drive and knows the make-up of the loop topology. As a result, when a LIR is issued by a drive connecting to the loop 100, every device attached to the loop temporarily ceases moving data and begins to participate in the loop initialization protocol.

Occasionally, for unknown reasons a drive will continuously and unnecessarily issue LIRs, even though the drive is established on the loop 100. When LIRs are continuously and unnecessarily issued, the loop 100 may, in some cases, no longer be able to handle data traffic since so many LIRs are being issued. For example, if a drive is issuing 20 or more LIRs every minute, the loop 100 will be constantly initializing and will be unable to transmit data altogether. Even if the drive is issuing fewer LIRs, unnecessary LIRs may slow data transfer. What is needed then is a way to remove drives that begin issuing LIRs unnecessarily.

SUMMARY

The present invention includes methods and apparatuses for monitoring storage devices in a loop. A threshold of a number of loop initialization requests issued over time is determined. A number of loop initialization requests issued by a storage device coupled to the loop is monitored. It is then determined whether then number of loop initialization requests issued by the storage device exceeds the threshold, and if so, the storage device is bypassed in the loop.

Other aspects of the invention will be apparent from the accompanying figures and from the detailed description which follows.

BRIEF DESCRIPTION OF THE DRAWINGS

One or more embodiments of the present invention are illustrated by way of example and not limitation in the figures of the accompanying drawings, in which like references indicate similar elements and in which.

DETAILED DESCRIPTION

Described herein are methods and apparatuses for detecting and remedying excessive loop initialization. Note that in this description, references to "one embodiment" or "an embodiment" mean that the feature being referred to is included in at least one embodiment of the present invention. Further, separate references to "one embodiment" or "an embodiment" in this description do not necessarily refer to the same embodiment. However, such embodiments are also not mutually exclusive unless so stated, and except as will be readily apparent to those skilled in the art from the description. For example, a feature, structure, act, etc. described in one embodiment may also be included in other embodiments. Thus, the present invention can include a variety of combinations and/or integrations of the embodiments described herein.

According to one embodiment of the invention, a drive shelf includes an embedded switching hub (ESH) that monitors incoming LIRs (LIRs) from drives attached to the ESH. When a number of LIRs issued by a single drive within a certain amount of time exceeds a threshold, firmware on the I/O card within the drive shelf requests that the ESH bypass that drive, to remove it from the loop. According to one embodiment, one threshold (a "burst" threshold) measures the number of LIRs issued within a short period of time (for example, one minute). If the number exceeds a threshold that would prevent other data from circulating through the loop, the drive is bypassed. A drive may be bypassed by, for example, disabling the port to which the drive is connected at the ESH, or by powering down the drive. A second threshold (a long-term threshold) can also be used, against which to compare the number of LIRs issued within a longer period of time (for example, ten minutes). If the drive issues a number of LIRs at a slower rate than the burst threshold, but still above the long-term threshold, the drive is bypassed. In this way, a drive issuing too many LIRs can be removed from the loop to improve data throughput.

Figure 1:
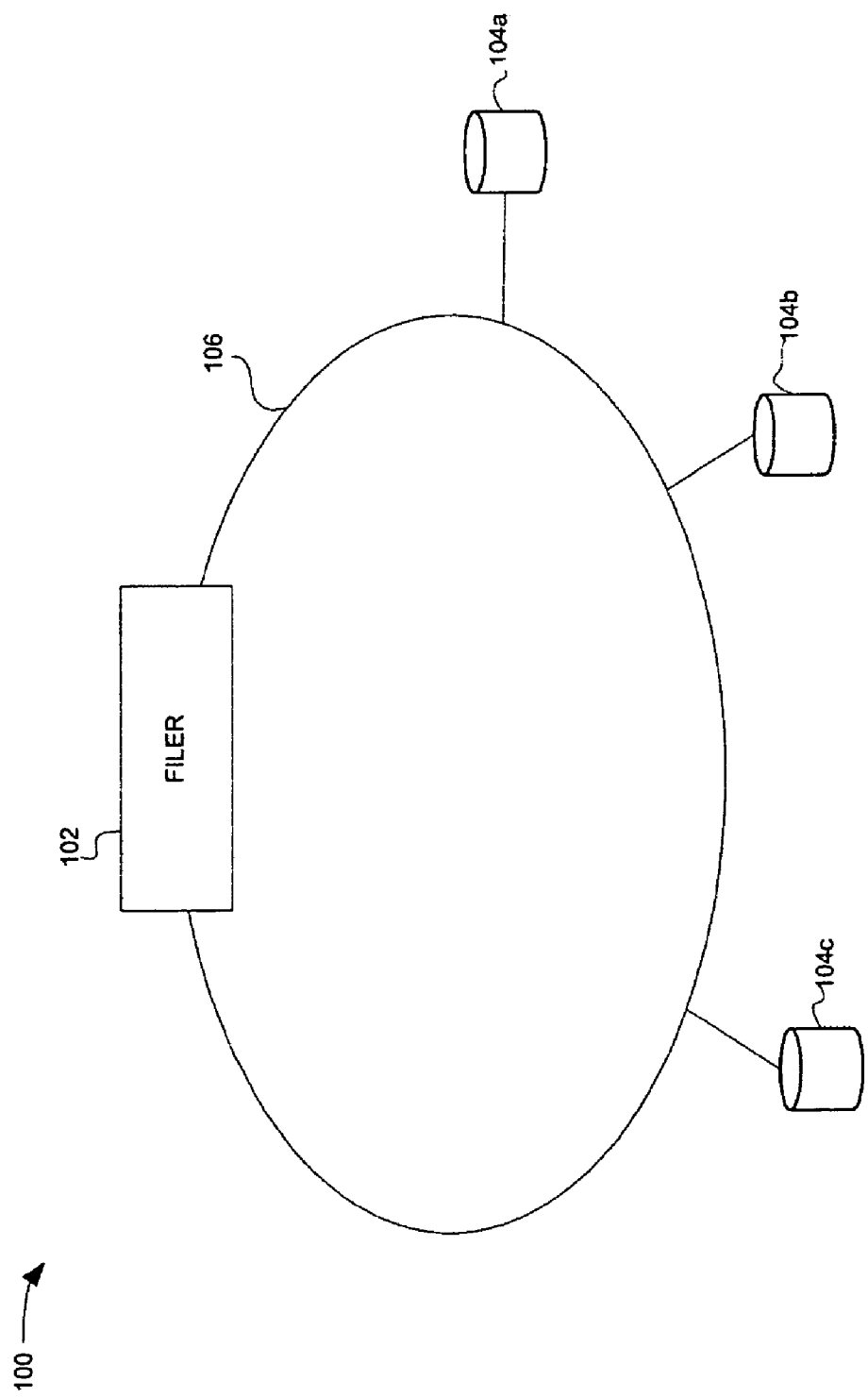
FIG. 1 illustrates a loop topology.
Figure 2:
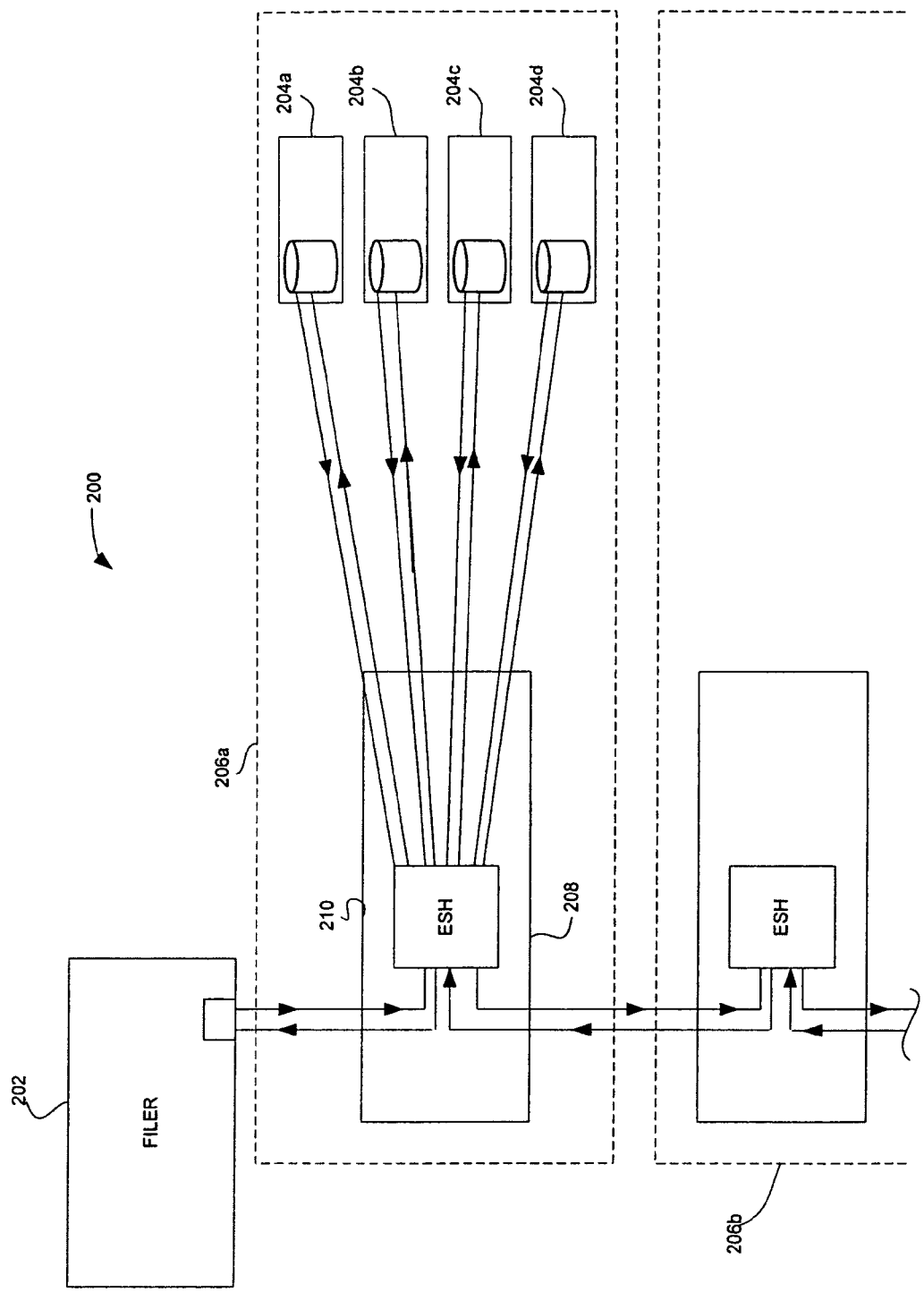
FIG. 2 illustrates a loop topography according to one embodiment of the invention.

FIG. 2 illustrates a loop topography according to one embodiment of the invention. The loop 200 includes a filer 202 that manages storage on several drives 204. Although a filer is described here, it is understood that any type of storage server, including those used in a storage area network (SAN) may be implemented. The drives 204 are physically stored in one or more shelves 206. For example, the shelf 206a encloses the drives 204a-204d. It is understood that more or fewer drives 204 may be contained in a shelf 206. The shelf 206 may also include hardware to manage and monitor a power supply and other system components. The drives 204 are, according to one embodiment, magnetic hard drives used with a redundant array of independent disks (RAID) system. However, it is understood that the drives 204 may be any type of storage device, including optical drives, semiconductor memories, etc.

The shelf 206a includes a processor card 208, on which an ESH 210 is provided. The ESH 210 may be implemented as, for example, an application specific integrated circuit (ASIC). The processor card 208 also includes other components that will be discussed below regarding FIG. 5. The ESH 210 monitors and manages devices within the shelf 206a, including the drives 204. The ESH has the ability to monitor traffic going to and coming from the drives 204, as well as the ability to enable and disable the drives 204. Each drive 204 is connected to the ESH 210 through a port that may be disabled, if appropriate, such as to bypass the connected drive. These abilities are used to realize certain embodiments of the invention.

According to one embodiment of the invention, the ESH 210 includes an application program interface (API) through which embodiments of the invention may be enabled. For example, according to one embodiment, the ESH 210 is a system-on-a-chip (SOC) 320 by Emulex® Corporation of Costa Mesa, Calif. Certain embodiments of this invention may be enabled using the API of the ESH 210. The ESH 210 may have the ability to monitor and bypass drives attached to it, and a routine written for the API can control these abilities. As will be discussed below, a processor in the shelf 206a may control the ESH 210 using the API.

From an external point of view, the drives 204 appear to be connected in a loop topology. The ESH 210 abstracts the fact that it uses a switching mode to directly route commands and data directly to the devices attached to it. For example, if the filer 202 issues a read command to the drive 204c, the command is first routed to the ESH 210. The command passes through the ESH 210, and directly into drive 204c. When the drive 204c fulfills the write request, the request enters ESH 210 and is routed directly back up to the filer 202 without having to pass through the remainder of the loop.

When a new drive, for example the drive 204d, is attached to the loop 200, the drive 204d issues LIRs to announce that it is attached and to request information about the loop. The ESH 210 receives the LIRs and transitions from switching mode to hub mode. In hub mode, the LIR request and the following loop initialization protocol traffic pass through each drive in loop fashion in order to reinitialize the loop. The drive 204d should typically request loop initialization once when it is connected. However, if the drive 204d continues issuing loop initialization, even though it is already connected to the loop 200, the traffic created by the loop initialization process reduces or halts the throughput of data, since the loop initializations and data requests occur on the same channel. The ESH 210 monitors the number of LIRs coming from the attached drives 204 in the shelf 206a.

According to one embodiment of the invention, if a drive (e.g., the drive 204a) issues more than a threshold number of LIRs (e.g., 3 LIRs in 24 seconds), the drive 204a is bypassed in the loop 200. The ESH 210 may employ two thresholds. The first threshold is a "burst" or short-term threshold. For example, the burst threshold may be 3 loop initializations per 24 seconds. The second threshold is a long-term threshold. Even though the number of LIRs issued by the drive 204a may not exceed the burst threshold, if the drive 204a is continually issuing LIRs, the throughput of the loop 200 is adversely affected. For example, the long-term threshold may be 15 LIRs per 10 minutes.

These thresholds may be adjustable using an interface, such as a graphical user interface (GUI), a command line interface (CLI) or filer-issued in-band SCSI Enclosure Services (SES) requests. A user can monitor data throughput and drive activity in the loop and determine whether the thresholds are effectively preventing excessive LIR activity in the loop 200. The loop 200 should allow legitimate LIR traffic, but prevent excessive LIR traffic due to a malfunctioning drive.

According to one embodiment, if the drives 204 are part of a RAID group or other grouping that includes redundant drives, removing a single drive does not affect data availability. The malfunctioning drive can be removed from the loop 200 and repaired or replaced, and another drive connected to the loop 200 can continue fulfilling the removed drive's obligations.

Figure 3:
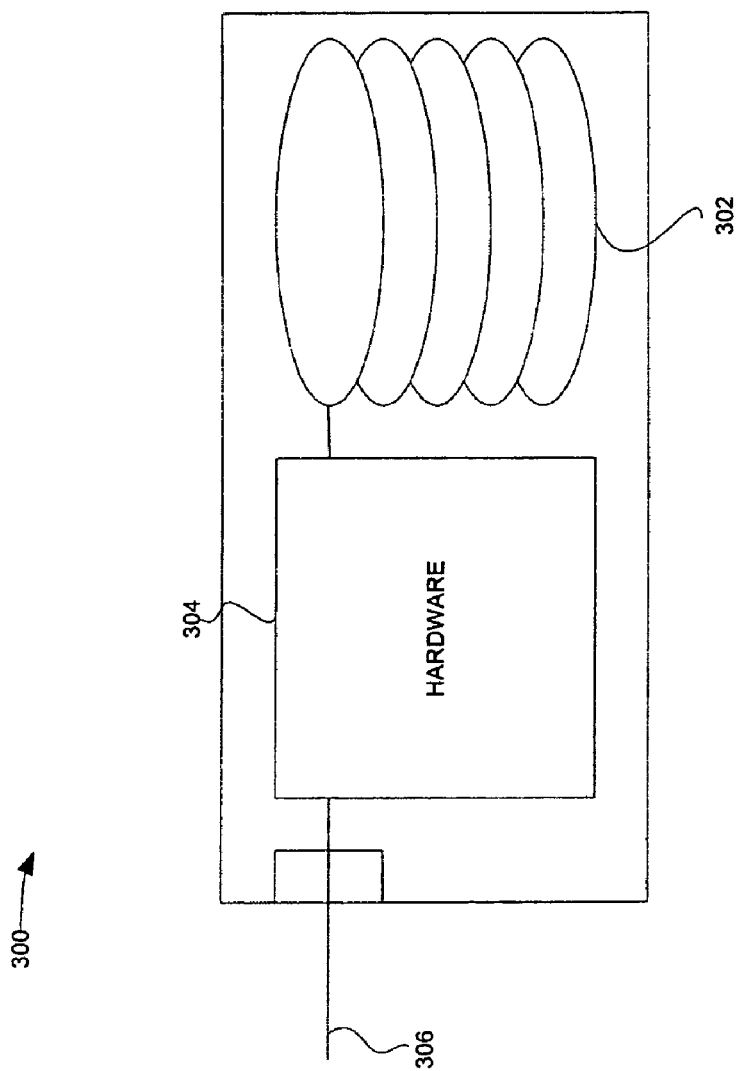
FIG. 3 illustrates a drive attached to the loop.

FIG. 3 illustrates a drive attached to the loop. The drive 300 may be representative of one of the drives 204 described above. The drive 300 includes one or more platters 302 that may be magnetic, optical, or any other type of platter for storing data. The drive 300 also includes drive hardware 304 such as an ASIC to manage and control the drive 300. Coupled to the hardware 304 is a loop interface 306. The loop interface 306 may be, for example, an FC-AL interface to attach the drive 300 to the loop 200.

The loop interface 306 may issue LIRs to the loop 200 when the drive 300 is attached to the loop 200. The loop interface 306 also sends identification information when another drive is attached to the loop 200 and requests identification information using a LIR.

Figure 4:
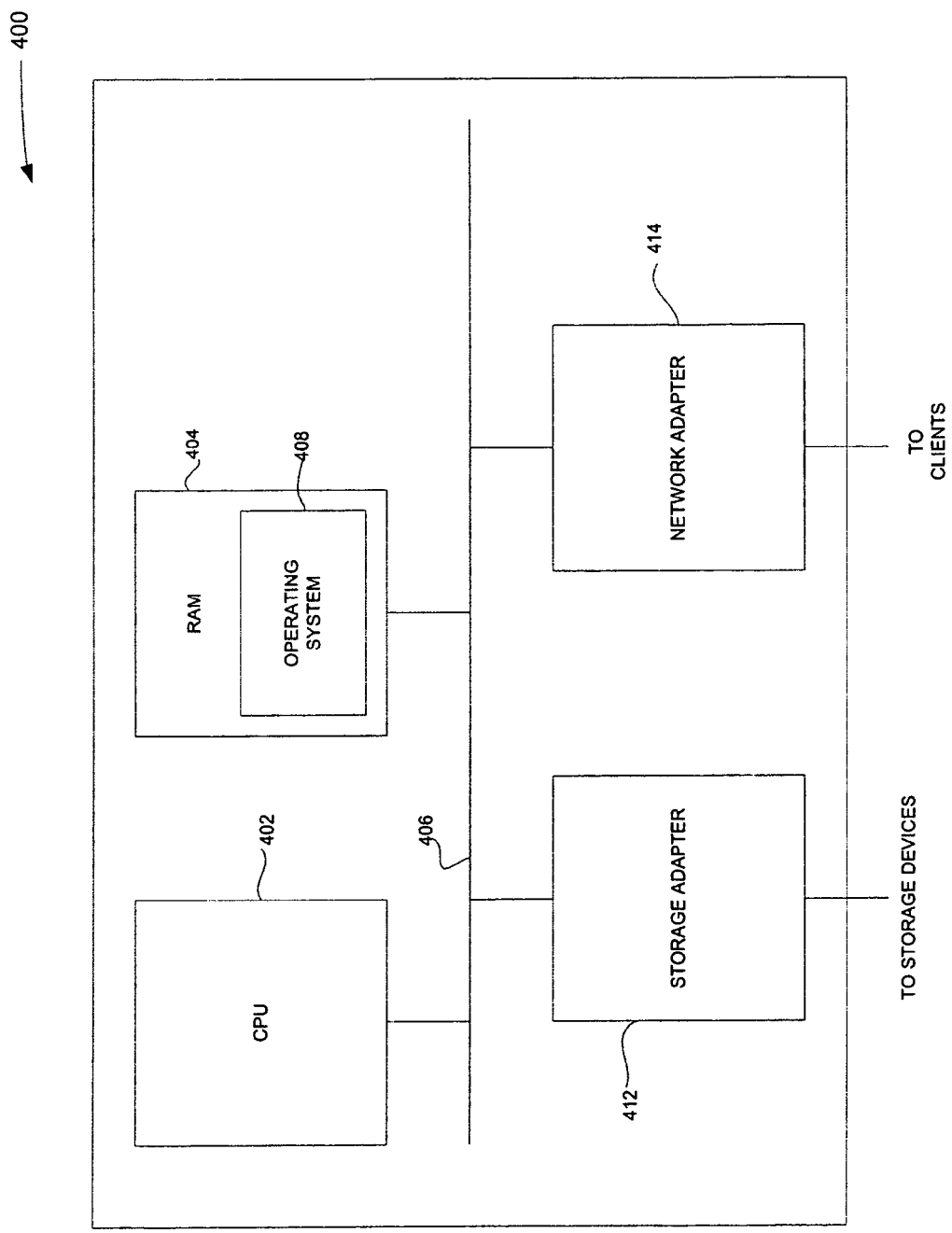
FIG. 4 shows the architecture of a filer according to certain embodiments of the invention.

FIG. 4 shows the architecture of a filer 400, representative of the filer 202, according to certain embodiments of the invention. A filer is a type of storage server used to store file data. Note that certain standard and well-known components which are not germane to the present invention are not shown. Note also that a type of storage server other than a filer could be used in conjunction with a shelf that implements the invention, such as a storage server that provides clients with block-level access to stored data. As illustrated, the filer 400 includes a processor 402 and main memory 404, coupled together by a bus system 406. The bus system 406 in FIG. 4 is an abstraction that represents any one or more separate physical buses and/or point-to-point connections, connected by appropriate bridges, adapters and/or controllers. The bus system 406, therefore, may include, for example, a system bus, a Peripheral Component Interconnect (PCI) bus, a Hyper-Transport or industry standard architecture (ISA) bus, a small computer system interface (SCSI) bus, a universal serial bus (USB), or an Institute of Electrical and Electronics Engineers (IEEE) standard 1394 bus (sometimes referred to as "Firewire").

The processor 402 is the central processing unit (CPU) of the filer 400 and, thus, controls the overall operation of the filer 400. In certain embodiments, the processor 402 accomplishes this by executing software stored in main memory 404. The processor 402 may be, or may include, one or more programmable general-purpose or special-purpose microprocessors, digital signal processors (DSPs), programmable controllers, application specific integrated circuits (ASICs), programmable logic devices (PLDs), or the like, or a combination of such devices.

The main memory 404, which is generally some form of random access memory (RAM), stores at least a portion of the operating system 408 of the filer 400. Techniques of the present invention may be implemented within the operating system 408, as described further below. The operating system 408 may be, for example, the Data ONTAP operating system by NetApp®. Also connected to the processor 402 through the bus system 406 are a storage adapter 412, and a network adapter 414. The storage adapter 412 allows the filer 400 to access the external mass storage devices such as the drive 204, and may be, for example, a Fibre Channel (FC) adapter or SCSI adapter. The network adapter 414 may include an Infiniband, FC, Ethernet, or other adapter, and may provide a connection allowing remote clients to communicate with the filer 400.

Figure 5:
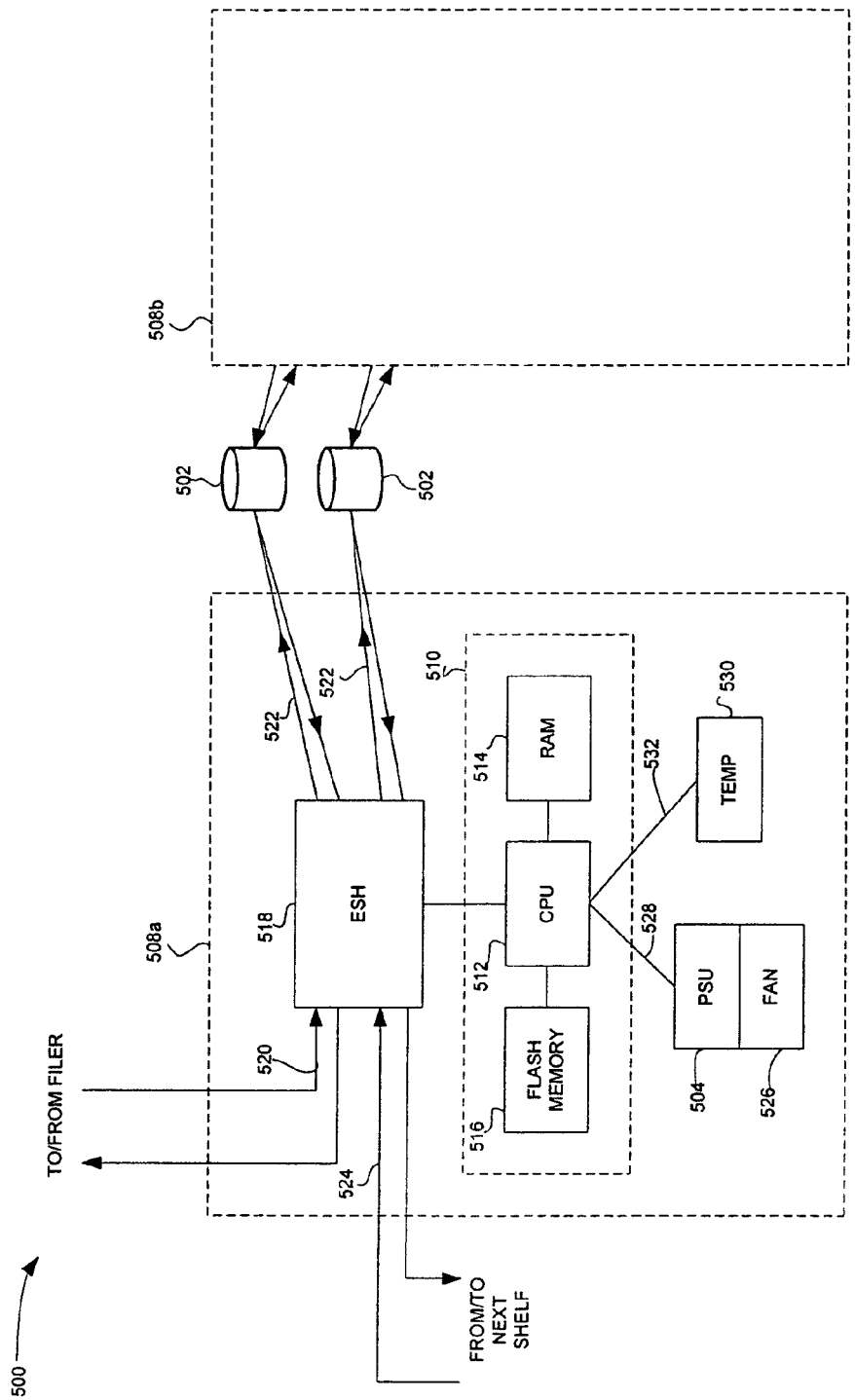
FIG. 5 illustrates a shelf according to one embodiment of the invention.

FIG. 5 illustrates a shelf according to one embodiment of the invention. The shelf 500 is representative of one of the shelves 206, as described above. The shelf 500 includes hardware to monitor attached drives 502 as well as the temperature of the shelf 500 and the status of operating components in the shelf such as a power supply unit (PSU) 504. The shelf 500 may, according to one embodiment of the invention, include redundant monitoring devices 508a and 508b to continue monitoring the shelf 500 should one of the monitoring devices 508a or 508b fail.

The monitoring device 508a, as well as the monitoring device 508b, includes a processor 512, which may be a conventional type of processor, such as a general-purpose or special-purpose programmable microprocessor of the type manufactured by NEC® or Intel®. Attached to the processor is a random access memory (RAM) 514 and a flash memory 516. The flash memory may include firmware instructions for implementing embodiments of the invention. The processor 512 is attached to an ESH 518, and may be used to control the ESH 518. Data is routed through an incoming connection 520 that may be attached to a filer or another shelf. If the incoming data is directed to one of the drives 502, connections 522 are used to send the data to the drives 502. If the incoming data is not directed to one of the drives 502, the incoming data is sent to the next shelf using a connection 524.

For example, the flash memory 516 may include instructions for implementing a burst threshold and a long-term threshold for LIRs according to an embodiment of the invention. The processor 512 may, according to these instructions, use the ESH 518 to monitor traffic coming from disk drives 502, and may use the ESH 518 to bypass a drive that is requesting loop initialization too often, as further described below with reference to FIG. 6. It is understood that although the ESH 518 and the processor 512 are shown here as individual components, that they may be integrated into a single integrated circuit (IC), or that any other well known configuration may be used.

The shelf may also include the PSU 504 and a fan 526 connected to the PSU 504. The processor 512 may use two-wire a link, such as an $I^2C$ link 528 to monitor the activity of the PSU 504 and the fan 526. The shelf 500 may also include a temperature sensor 530 connected to the processor 512 using another $I^2C$ link 532. The shelf may further include other components for monitoring the shelf 500 and its various components.

Figure 6:
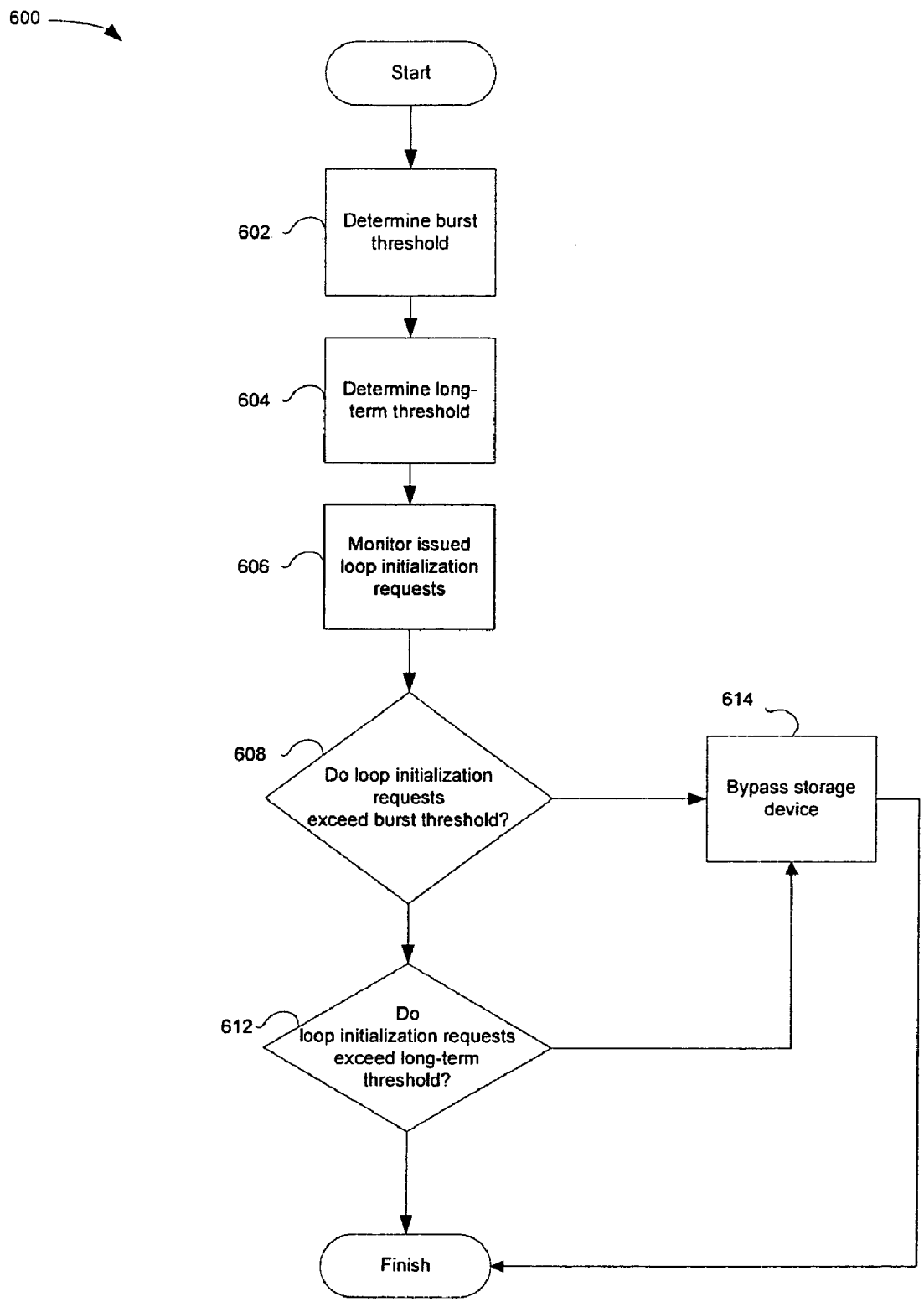
FIG. 6 is a flowchart describing a process for monitoring a drive and for removing a drive from a loop topology if the drive issues too many loop initialization requests.

FIG. 6 is a flowchart describing a process for monitoring a drive and for bypassing a drive and removing it from a loop topology if the drive issues too many LIRs. According to one embodiment of the invention, the process 600 is performed using the ESH 210.

In block 602, a threshold for the burst rate is determined. The burst threshold is a threshold number of LIRs over a short period of time. The burst threshold is used to determine whether too many LIRs are issued by a drive in a short period of time. For example, according to one embodiment, if a drive issues three or more LIRs in 24 seconds, the drive has exceeded the burst threshold. In other embodiments, a different number of LIRs could be used as the burst threshold. An excessive number of LIRs being issued by a single drive in a short period of time can prevent data traffic from moving through the loop 200, so if the burst threshold is exceeded, the drive exceeding it should be disabled.

In block 604, a threshold number of LIRs for the long-term rate is determined. Although a drive may not be issuing enough LIRs to exceed the burst threshold, a drive may be issuing enough LIRs to impede data flow, even though data is still moving. The long-term threshold may be over a longer period such as ten minutes. For example, the long-term threshold may be 15 LIRs per 10 minutes. In other embodiments, a different number of LIRs could be used as the long-term threshold.

In block 606, the ESH 210 monitors traffic from the drives 204. The ESH 210 counts the number of LIRs issued by all the drives 204, and the time at which they were issued. In block 608, if the burst threshold is exceeded, in block 610, the drive exceeding the burst threshold is bypassed. The ESH 210 may, for example, monitor each LIR issued by each drive 204, and record a time at which each LIR was issued. If the burst threshold is measured over 24 seconds, for example, once a LIR is 24 seconds old, that LIR is no longer counted toward the burst threshold.

In block 612, it is determined whether the long-term threshold has been exceeded. As above, the ESH 210 monitors and assigns ages to all LIRs issued by the drives 204. If a drive issues more LIRs than the threshold allows, the drive is bypassed (e.g., by disabling its port in the ESH 210) in block 610. If the drive is exceeding neither threshold, the process 600 ends.

This invention has been described with reference to specific exemplary embodiments thereof. It will, however, be evident to persons having the benefit of this disclosure that various modifications and changes may be made to these embodiments without departing from the broader spirit and scope of the invention. The specification and drawings are accordingly to be regarded in an illustrative rather than in a restrictive sense.

What is claimed is:

1. A method for monitoring storage devices in a loop comprising:

determining a short-term threshold counting a number of loop initialization requests issued per a first period of time;

determining a long-term threshold counting a number of loop initialization requests issued per a second period of time longer than the first period of time;

monitoring a number of loop initialization requests issued by a storage device coupled to the loop;

determining whether the number of loop initialization requests issued by the storage device exceeds the short-term threshold or the long-term threshold; and if the number of loop initialization requests issued by the storage device exceeds the short-term threshold or the long-term threshold, functionally removing the storage device from the loop.

2. The method of claim 1, further comprising:
adjusting the threshold based on a desired data throughput of the loop.

3. The method of claim 1, wherein bypassing the storage device comprises:
disabling a port coupling the storage device to the loop.

4. The method of claim 3, wherein monitoring a number of loop initialization requests comprises:
using an embedded switching hub (ESH) including the port coupled to the storage device to count a number of loop initialization requests issued by the storage device.

5. The method of claim 4, further comprising:
controlling the ESH through an application program interface (API) to perform the monitoring and the removing.

6. The method of claim 1, further comprising:
fulfilling data requests to the storage device using a redundant storage device.

7. The method of claim 1, wherein the loop is a FC-AL loop.

8. A system comprising:
a processor;
a memory coupled to the processor, the memory including instructions which, when executed by the processor, cause the system to:
determine a short-term threshold counting a number of loop initialization requests issued per a first period of time;
determine a long-term threshold counting a number of loop initialization requests issued per a second period of time longer than the first period of time;
monitor a number of loop initialization requests issued by a storage device coupled to a loop during a specified period of time;
determine whether the number of loop initialization requests issued by the storage device during the specified period of time exceeds the short-term threshold or the long-term threshold; and
functionally remove the storage device from the loop if the number of loop initialization requests issued by the storage device during the specified period of time exceeds the short-term threshold or the long-term threshold.

9. The system of claim 8, wherein the processor further is to adjust the threshold based on a desired data throughput of the loop.

10. The system of claim 8, wherein the processor comprises:
an embedded switching hub (ESH) including a port coupled to the storage device; and
a central processing unit (CPU) coupled to the ESH to control the ESH.

11. The system of claim 10, wherein the ESH further is to:
report a number of loop initialization requests issued by the storage device; and
disable the port if the number of loop initialization requests exceeds the threshold.

12. The system of claim 10, wherein the ESH includes an application program interface (API), and wherein the CPU controls the ESH through the API.

13. The system of claim 10, wherein the loop is an FC-AL loop.

14. A method for monitoring storage devices in a loop comprising:
determining a short-term threshold for a number of loop initialization requests issued over a first time period;
determining a long-term threshold for a number of loop initialization requests issued over a second time period longer than the first time period;
monitoring a number of loop initialization requests issued by a storage device coupled to the loop;
determining whether the number of loop initialization requests issued by the storage device exceeds either the short-term threshold or the long-term threshold; and
if the number of loop initialization requests issued by the storage device exceeds either the short-term threshold or the long-term threshold, bypassing the storage device in the loop.

15. The method of claim 14, further comprising:
adjusting the short-term threshold and the long-term threshold based on a desired data throughput of the loop.

16. The method of claim 14:
wherein monitoring the number of loop initialization requests issued by the storage device is performed by an ESH; and
wherein bypassing the storage device in the loop is performed by the ESH.

17. The method of claim 16, wherein bypassing the storage device in the loop comprises:
disabling a port of the ESH coupled to the storage device.

18. The method of claim 16, wherein the loop is a FC-Al loop.

* * * * *